United States Patent
Barone, Jr. et al.

(10) Patent No.: US 7,228,349 B2
(45) Date of Patent: Jun. 5, 2007

(54) SYSTEM AND METHOD FOR INTERACTING WITH USERS OVER A COMMUNICATIONS NETWORK

(75) Inventors: Samuel T. Barone, Jr., Los Angeles, CA (US); Drake Smith, Oxford, CT (US)

(73) Assignee: GoldPocket Interactive, Inc., Los Angeles, CA (US)

( * ) Notice: Subject to any disclaimer, the term of this patent is extended or adjusted under 35 U.S.C. 154(b) by 730 days.

(21) Appl. No.: 09/944,905

(22) Filed: Aug. 31, 2001

(65) Prior Publication Data

US 2002/0049843 A1 Apr. 25, 2002

Related U.S. Application Data

(60) Provisional application No. 60/230,222, filed on Aug. 31, 2000.

(51) Int. Cl.
| | |
|---|---|
| *G06F 15/173* | (2006.01) |
| *G06F 15/16* | (2006.01) |
| *G01R 31/08* | (2006.01) |
| *H04J 1/16* | (2006.01) |
| *H04L 12/26* | (2006.01) |
| *G06F 11/00* | (2006.01) |
| *H04N 7/173* | (2006.01) |
| *G08C 15/00* | (2006.01) |
| *H04J 3/14* | (2006.01) |
| *H04L 1/00* | (2006.01) |

(52) U.S. Cl. ............. 709/225; 709/223; 709/224; 709/235; 725/95; 725/96; 370/232; 370/238

(58) Field of Classification Search ........... 709/203, 709/223–226, 234, 235, 241; 714/6; 348/211.3; 725/95, 96; 370/232–238
See application file for complete search history.

(56) References Cited

U.S. PATENT DOCUMENTS 5,519,640 A * 5/1996 Ganesan et al. ............ 709/236

(Continued)

OTHER PUBLICATIONS

Krikelis, Argy. "Scalable Multimedia Servers," IEEE Concurrency, vol. 6, Issue 4, Oct.-Dec. 1998, pp. 8-10.*

(Continued)

*Primary Examiner*—Jason Cardone
*Assistant Examiner*—Melvin H. Pollack
(74) *Attorney, Agent, or Firm*—Christie, Parker & Hale, LLP.

(57) ABSTRACT

A system and method for efficiently and quickly handling content and transaction requests from various users at respective end terminals. According to embodiments of the invention, plural servers are provided at the web site to randomly receive requests from users over a communications network, such as the Internet. Each server contains a memory, such as a cache or disk storage process, that contains a copy of all data contained on every other server. When a request comes in to one of the servers, in addition to processing the request, that server broadcasts data corresponding to the request to the other servers, which are programmed to store the same request data in their respective local memories. Such broadcasts may be preferably carried out over a back-end, private network.

37 Claims, 6 Drawing Sheets

U.S. PATENT DOCUMENTS

| | | | |
|---|---|---|---|
| 5,815,146 | A | 9/1998 | Youden et al. |
| 5,867,657 | A | 2/1999 | Bolosky et al. |
| 5,883,661 | A * | 3/1999 | Hoarty .................... 725/93 |
| 5,903,816 | A * | 5/1999 | Broadwin et al. .......... 725/110 |
| 5,916,303 | A * | 6/1999 | Scott ..................... 709/217 |
| 5,925,100 | A * | 7/1999 | Drewry et al. ............. 709/219 |
| 5,928,331 | A * | 7/1999 | Bushmitch ................ 709/231 |
| 5,933,603 | A * | 8/1999 | Vahalia et al. ............. 709/225 |
| 6,006,264 | A * | 12/1999 | Colby et al. ............... 709/226 |
| 6,038,601 | A * | 3/2000 | Lambert et al. ............ 709/226 |
| 6,061,504 | A * | 5/2000 | Tzelnic et al. ............. 709/219 |
| 6,067,559 | A * | 5/2000 | Allard et al. .............. 709/202 |
| 6,094,680 | A * | 7/2000 | Hokanson ................ 709/223 |
| 6,097,422 | A * | 8/2000 | Aref et al. .................. 725/94 |
| 6,112,239 | A * | 8/2000 | Kenner et al. ............. 709/224 |
| 6,134,596 | A * | 10/2000 | Bolosky et al. ............ 709/233 |
| 6,195,680 | B1 * | 2/2001 | Goldszmidt et al. ........ 709/203 |
| 6,351,775 | B1 * | 2/2002 | Yu .......................... 709/238 |
| 6,377,992 | B1 * | 4/2002 | Plaza Fernandez et al. . 709/227 |
| 6,401,126 | B1 * | 6/2002 | Douceur et al. ........... 709/223 |
| 6,571,349 | B1 * | 5/2003 | Mann et al. ................. 714/6 |
| 6,578,068 | B1 * | 6/2003 | Bowman-Amuah ......... 709/203 |
| 6,587,866 | B1 * | 7/2003 | Modi et al. ................ 718/105 |
| 6,601,101 | B1 * | 7/2003 | Lee et al. .................. 709/227 |
| 6,658,473 | B1 * | 12/2003 | Block et al. ............... 709/226 |
| 6,714,545 | B1 * | 3/2004 | Hugenberg et al. ........ 370/395.1 |
| 6,725,303 | B1 * | 4/2004 | Hoguta et al. ............. 710/106 |
| 6,728,895 | B1 * | 4/2004 | Nelson ........................ 714/4 |
| 6,760,763 | B2 * | 7/2004 | Jennings et al. ........... 709/224 |
| 6,779,039 | B1 * | 8/2004 | Bommareddy et al. ..... 709/238 |
| 6,804,711 | B1 * | 10/2004 | Dugan et al. .............. 709/223 |
| 6,816,628 | B1 * | 11/2004 | Sarachik et al. ........... 382/285 |
| 6,879,720 | B2 * | 4/2005 | Sarachik et al. ........... 382/199 |
| 2002/0129381 | A1 * | 9/2002 | Barone et al. ............. 725/137 |
| 2005/0005303 | A1 * | 1/2005 | Barone et al. ............. 725/110 |
| 5,559,764 | A | 9/1996 | Chen et al. |
| 5,570,355 | A * | 10/1996 | Dail et al. ................. 370/352 |
| 5,774,668 | A * | 6/1998 | Choquier et al. ........... 709/223 |
| 5,790,806 | A * | 8/1998 | Koperda ................... 709/252 |

OTHER PUBLICATIONS

Kerr, G. W. "Interactive Multimedia Services," Sixth Intl. Conference on Image Processing and its Applications, vol. 1, Jul. 17, 1997, pp. 7-11.*

Blahut, Donald E. et al. "Interactive Television," Proceedings of the IEEE, vol. 83, No. 7, Jul. 1995, pp. 1071-1085.*

Lim, Kyung E. et al. "Dynamic Load Balancing Technique for Wide Area Video Server," High Performance Computing on the Information Superhighway, May 2, 1997, pp. 109-116.*

Wu, Jean-Lien C. et al. "Load Shift Protocol Design in ATM-based VOD Systems," 12th Intl. Conf. on Information Networking, Jan. 23, 1998, pp. 222-227.*

Billot, Manuel, et al. "Improving Reliability of Distributed VoD Servers," IEEE Intl. Conf. on Multimedia Computing and Systems, Jun. 6, 1997, pp. 253-260.*

Birk, Yitzhak. "Random RAIDs with Selective Exploitation of Redundancy for High Performance Video Servers," Proceedings of the IEEE 7th Intl. Workshop on Network and Operating System Support for Digital Audio and Video, May 21, 1997, pp. 13-23.*

* cited by examiner

SYSTEM AND METHOD FOR INTERACTING WITH USERS OVER A COMMUNICATIONS NETWORK

CROSS-REFERENCE TO RELATED APPLICATIONS

This application claims priority from provisional application No. 60/230,222 entitled "System and Method for Interacting with User over a Communications Network" filed Aug. 31, 2000, which is incorporated by reference herein as though set forth in full.

FIELD OF THE INVENTION

The present invention relates to techniques for efficiently interacting with plural end users over a communications network. More particularly, the invention relates to a distributed system with plural server nodes that are continually updated such that each node is capable of handling any incoming request from any user.

BACKGROUND OF THE INVENTION

Communications networks, such as the Internet, wide area networks (WAN), local area networks (LAN), and the like, are used for many different purposes. One of the major purposes of such a network is the transmission of data from one location to another, for example, from a central hub to a plurality of end user terminals. Such data can be simple text data, a combination of text and graphic data, video data, audio data, and the like.

In the case of the Internet, a large number of users may be accessing a particular web site at any given time. Commonly, the users accessing the same site are routed to various servers located at the web site facility, using an Internet facility, which distributes the requests among the various servers. In other embodiments the user requests are routed by a machine, which may be used to balance the demand among the various servers, such that the load is generally evenly spread between the respective servers. The servers commonly have access to a central database that contains all of the content, which the users may request from the web site. Thus, it does not matter which server is assigned to a user at any particular time, since any server can access the database and retrieve the content.

One use of the Internet is to facilitate interactive television ("ITV"). Interactive television combines conventional television with additional content ("interactive content") to present a viewer with an enhanced version of a television program or commercial. In order to experience interactive TV, a viewer may make use of an ITV receiver. Such an ITV receiver may be, for example a "set-top" box, or a TV receiver that has built-in ITV receiver capabilities. ITV receivers may receive specially prepared TV signals which may include, but are not limited to, ITV data in the form of Uniform Resource Locators ("URLs"), triggers (e.g., Javascript function calls), and display files. An ITV receiver receives and decodes ITV data, which may then be used to access interactive content from a remote location.

Today, interactive television commonly uses the World Wide Web ("Web") technology for delivering and viewing enhanced content. Specific web sites, addressed using URLs, are created and maintained as ITV sites. The content of many of these sites may be viewed using ITV receivers in much the same way that a computer can browse a web site. ITV receivers may include web browsers, which may display downloaded content along with TV video on a conventional television set. ITV receivers may obtain ITV web content via one of the ITV web sites, for example over a telephone line, which connects the ITV receiver to the Internet via an Internet service provider (ISP). Which sites are accessed, and how content is displayed, is determined by the ITV content. ITV content commonly includes links and triggers contained in the video portion of an ITV program. One method for encoding interactive TV links and triggers is specified in Electronic Industries Association specification number 746 (EIA-746) which is entitled "Transport of Internet Uniform Resource Locator (URL) Information Using Text-2 Service". EIA 746 is hereby expressly incorporated by reference herein.

Commonly, when a television program with available ITV content is received, the ITV viewer is given an option to receive the enhanced experience. If the viewer chooses to take advantage of the enhancements, the ITV receiver may establish a telephone connection to the Internet (if a connection is not already made), find an ITV web site based on a URL embedded in the ITV program, and download content that produces the enhanced experience.

FIG. 1 illustrates the overall signal and data flow for an exemplary ITV system. During the production phase of an ITV program or commercial, a program is edited from one or more master recordings 10. During the editing certain URL links and command triggers are embedded, by means of a data encoder 12, into the program, for example, in the vertical blanking interval ("VBI") of the video portion of the ITV program. A data recorder 14 records the modified program for subsequent broadcast.

When desired the ITV program is broadcast, along with the embedded URLs and/or command triggers, by means of a data player 16 and broadcast station 18. An ITV receiver 20 in a viewer's home may receive these URLs and triggers. The ITV receiver may use the URLs and triggers to retrieve enhanced content from the Internet 21, for example by way of a telephone interface 22. The telephone interface may provide a two-way communication between the viewer and an ITV server 23. The telephone interface commonly also provides the majority of the interactive content as the bandwidth reserved for ITV data in today's TV transmissions is low. The TV program, along with the retrieved content, is displayed on a television or other display 24.

One form of interactive TV is interactive game show, which allows a user to play along with a game show using their ITV receiver. The web site providing the interactive game show content may also maintain a score for the user, as well as registration and transaction information. Conventionally, the necessary data for making the game show interactive, as well as received registration and transaction information, is stored at the single, central database so as to be accessible by all of the web servers. The storage of ITV data in a single central database can lead to delays, as each server must retrieve data from the same central database.

Thus, it would be desirable to have a system and method whereby multiple servers may accommodate a relatively large number of users over a communications network in a quick and efficient manner. In addition, it would be desirable to have a system and method that can dynamically control the particular content based on the users that access the system.

SUMMARY OF THE DISCLOSURE

The present disclosure is directed to a system and method for efficiently and quickly handling content and transaction requests from various users at respective end terminals over a communications network. According to embodiments of the invention, plural servers are provided to randomly receive requests from users over a communications network, such as the Internet. Each server contains a memory, such as a cache or disk storage, that contains a copy of all data contained on every other server. When a request comes in to one of the servers, that server, in addition to processing the request, broadcasts data corresponding to the request to the other servers, which are programmed to store the data on their respective local memories. Such broadcasts may be carried out over a dedicated, private network.

Thus, one embodiment of the invention is directed to a system for interacting with end user ITV terminals over a communications network. The illustrative embodiment includes plural servers adapted for communication with user terminals over the communications network. Additionally the plural servers are coupled for communication with each other. An interface to the plurality of servers operates to receive requests from users and to route the requests to various servers. Each of the servers is programmed similarly to receive user requests, process the requests, and broadcast data regarding the processed request to the other servers. The other servers are programmed to store the broadcast data.

BRIEF DESCRIPTION OF THE DRAWINGS

The description of the disclosure, described in summary above, can be better understood with respect to the following specification and claims by reference to the included illustrative Figures in which like numbers refer to similar elements throughout:

DETAILED DESCRIPTION OF THE DISCLOSURE

As used herein, the term "interactive content" is used to refer to any additional content that is distinct from the picture and sound of a typical TV program which may be retrieved from some source other than the TV signal itself, and that is intended to be used with a corresponding TV program to create an enhanced program.

As used herein, the term "ITV receiver" is intended to refer to set-top boxes, digital cable boxes, personal computers equipped with TV receiving capabilities, or any other suitable device which has ITV capabilities.

As used herein, the designation "terminal" is intended to refer to computers, ITV receivers, or any other device that can engage in two-way communication over a communications network.

Figure 1:
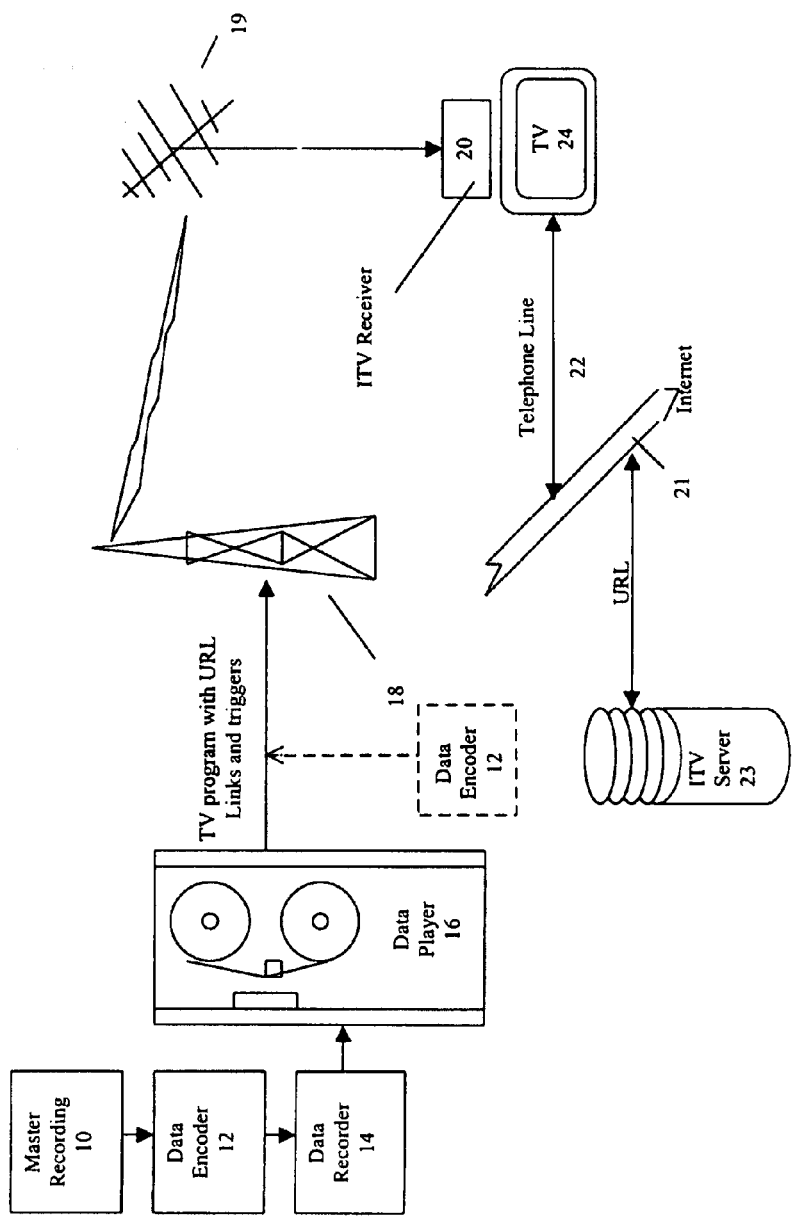
FIG. 1 is a graphic illustration, which illustrates an exemplary interactive TV system.
Figure 2A:
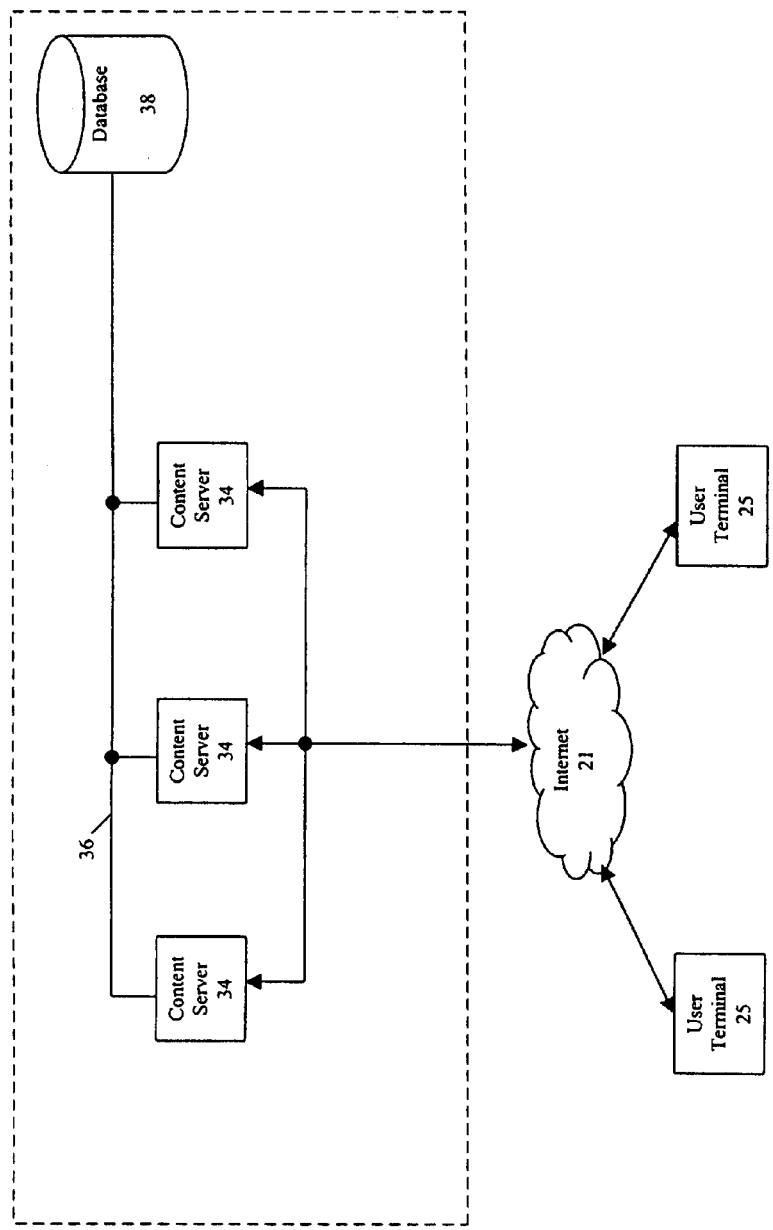
FIG. 2A is a block diagram of a system according to one embodiment of the invention.

Referring to FIGS. 2A, request system 30 is operative to handle various requests from plural end users over a communications network. The request system 30 also illustrates the system functionality, according to an embodiment of the present invention.

System 30 is designed for two-way communication with a plurality of user terminals 25 over a communication network, such as the Internet 21, some other computer network, or any interface that provides for two-way communication of data. System 30 is designed to receive a plurality of requests over the Internet 21 using a plurality of nodes (e.g., servers 34) for receipt of those requests. The Internet Domain Name Service (DNS), provided as a functionality of the Internet, may direct requests to content servers 34 (alternatively referred to as nodes, server nodes, or servers) using, for example, a round robin selection method. In this manner, the burden may be shared in generally equal amounts between the respective nodes.

In the embodiment illustrated in FIG. 2A, the DNS addresses the incoming requests to a plurality of content servers 34. Commonly, the content servers may comprise HTTP ("hypertext transfer protocol") servers with appropriate software and hardware to provide database functionality, as described in more detail below. HTTP is a set of standards used by computers to transfer hypertext files (i.e., web pages) over the Internet.

Content servers 34 may be distributed in nature and redundant. Each content server 34 may equivalently provide web content, to user terminals 25, over the Internet 21. In order to minimize latencies in embodiments of the system, modified system software stored at each server may be implemented as operating system functions, and may run in the kernel (i.e., the central module) of a server's operating system.

Each content server 34 may be designed so as to be self-contained, with each server maintaining a copy of all the data necessary for processing incoming requests from any user. In particular, each content server 34 may maintains all the information necessary for transmitting content to a user, processing user registration and log-on information, and user transaction information.

Figure 2B:
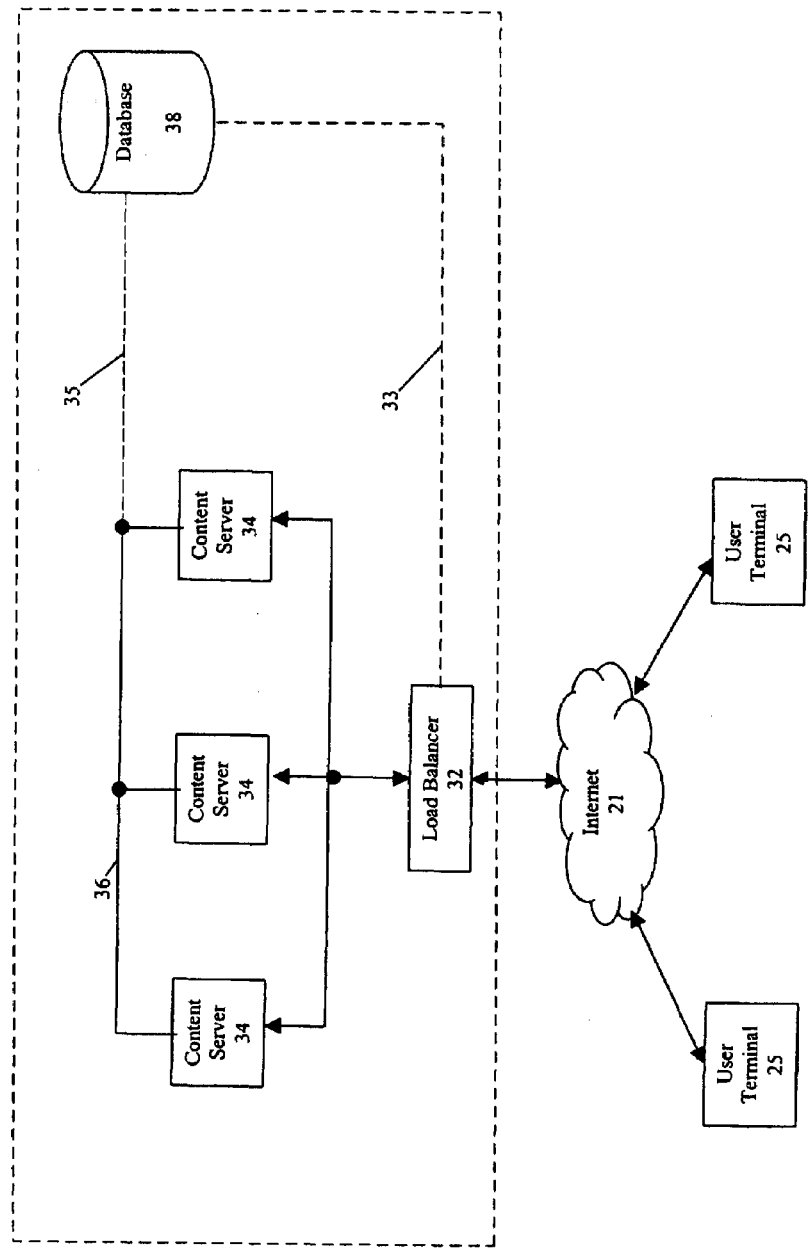
FIG. 2B is a block diagram of a system according to another embodiment of the invention.

Referring now to FIG. 2B, system 30 includes a load balancing system (LBS) 32 that is designed for two-way communication with a plurality of user terminals 25 over a communication network, such as the Internet 21, some other computer network, or any interface that provides for two-way communication of data. LBS 32 is designed to receive a plurality of requests over the Internet 21 and to pick between a plurality of nodes (e.g., servers 34) for receipt of those requests. The LBS may allocate requests to nodes using various schemes, such as for example round robin allocation. In this manner, the burden may be shared in generally equal amounts between the respective nodes.

In the embodiment illustrated in FIG. 2B, LBS 32 routes the incoming requests to a plurality of content servers 34. Similar to the illustrated and described system of 2A, the content servers may comprise HTTP servers with appropriate software and hardware to provide database functionality, Similarly to the system referenced in FIG. 2A, the content servers 34 of FIG. 2B may be distributed in nature and redundant. Each content server 34 may equivalently provide web content, to user terminals 25, over the Internet 21. In order to minimize latencies in embodiments of the system, modified system software stored at each server may be implemented as operating system functions, and may run in the kernel (i.e., the central module) of the server's operating system. Alternatively the system software may be run entirely as an application outside of the operating system, or a combination of application and operating system function.

Like the system of 2A the content servers 34 of FIG. 2B may be designed so as to be self-contained, with each server maintaining a copy of all the data necessary for processing incoming user requests.

In either illustrative embodiment 2A or 2B, content servers 34 may interconnect to each other over a private, back-end network 36. The back-end network 36 is not directly accessible by users via the Internet 21, and thus data and other information can be transmitted over back-end network 36 without the need for encryption. Additionally, since the back end network services a limited number of content servers, data traffic can be minimized to facilitate the necessary traffic between content servers. Back-end network 36 connects to each of the content servers 34, and may connect to one or more other devices, as described in greater detail below. Thus, the transmission of data over private network 36 is performed in a manner transparent to the end users at the respective terminals 25. Additionally in the system illustrated in FIG. 2B the functions of the back-end network 36 may be programmed into the LBS if desired.

Back-end network 36 may be designed to provide sufficient bandwidth for handling a large number of servers 34. For example, network 36 may comprise a gigabit Ethernet network.

Content servers 34 are designed to handle various tasks based upon the information received from a user over the Internet 21. For example, the information may be a request for content, incoming user registration information, user transaction information, or the like. Content servers 34 are programmed to receive and process such requests, as described in greater detail below.

In addition, content servers 34 are configured in such a manner that each server may handle any incoming request, without the need to retrieve information from any external source. Because of this, system 30 may process requests in a fast efficient manner.

System 30 may provide multiple redundant servers. Additionally system 30 is modular and accordingly easily serviced. For example, if the number of user requests escalates to the point where another server 34 becomes necessary, a new server may be connected to network 36 and a "startup image" of one of the other servers may be copied to the new server, and the appropriate network addresses programmed. The term "startup image" is used to denote the memory image, commonly on a hard disk, that is present when the system is turned on. The startup image generally comprises the software, such as operating system and application programs. Such programs are used for operation of the system and for the performance of the system as a server. Once the "startup image" of one of the other servers is copied to the new server and the appropriate network addresses programmed new server is then ready to handle incoming requests. In addition, if one of the existing servers 34 malfunctions, the malfunctioning server can be repaired or replaced, with the replaced server then receiving a copy of the startup image from an existing server. Once the proper network addresses are initialized the server is ready to be brought on-line to process incoming requests.

In addition, it will be understood by those skilled in the art that the servers 34 need not be physically grouped together, but can be spread out over a geographic region. The back-end network 36 connects the servers 34 together so that they can communicate, even if the servers 34 are physically spread out over a geographic region.

Figure 3:
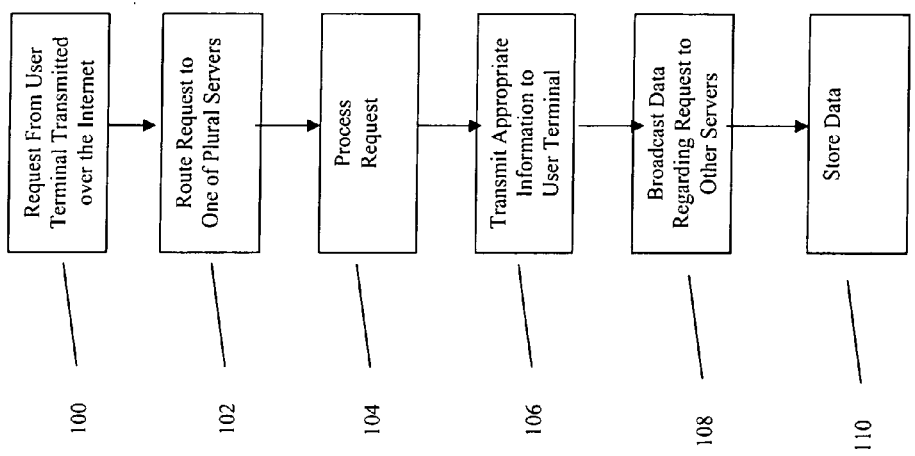
FIG. 3 is a flow chart of the operational steps involved in connection with the overall system of FIG. 2A or FIG. 2B.

Referring now to FIG. 3, operation of the system 30 is described in more detail. Operation begins at step 100, with a request generated at one of the user terminals 25 that is transmitted via the Internet 21 to system 30. At step 102 one of the servers 34 accepts the user request. As described above, the routing of incoming requests is commonly done in such a manner so as to balance the load between the respective servers 34. For example, the Internet DNS may allocate requests to servers in a round-robin fashion, or an LBS may allocate the request to a particular server. Thus, for a particular incoming request, any server 34 may be selected to handle the request. The identity of the user terminal 25 from which the request originated is immaterial to the fulfillment of the requests, as is the particular server 34, which handles it.

Once the request has been routed to the server 34, which will handle the request, operation proceeds to step 104 and the designated server 34 processes the request. As described above, the request can take many different forms, such as a request for content (e.g., a video file, an audio clip, a text document, or the like), a registration-related request, or a transaction request. The server 34 handles the request and performs a corresponding function, such as retrieving content and transmitting that content to the user terminal 25 over the Internet 21, at step 106.

In the case of a registration or log-in request, server 34 will receive the incoming request and transmit a query to the user terminal 25 for the necessary information, such as a user name and password.

Once the server 34 has performed the necessary function or functions based on the received request, operation proceeds to step 108, and the server 34 that processed the request broadcasts information relating to the request over the back-end network 36, or equivalent. In the case of a request for content, the broadcast information may simply be an indication that the particular content was transmitted to the end user.

In the case of a user attempting to register with or log onto the system 30, the information will likely include some information to identify the user terminal. At step 110, the broadcast information is received by each server 34 and stored in a local cache memory or the like within each server.

A user registering with or logging onto the system 30 will transmit a number of requests, for example, an initial request to register, followed by additional information as required by system 30. A different server 34 may receive each request from user terminal 25. By broadcasting information to the other servers 34 after each server user transaction, a subsequent request from the user terminal 25 may be processed by any of the servers 34, without the need for referring to a remote database or to a specific server 34.

In the just described embodiment transaction data is broadcast over the back-end network 36. Alternately the transaction information may be transmitted through the LBS, in which case the LBS would be programmed to be responsive to receipt of such information and transmit the transaction information to the plurality of servers 34 (except for the originating server).

In this manner, when subsequent requests are received from a user terminal 25, the requests may be routed to any of the servers 34, without the need for the server to access a remote database to process the user request. For example, in the case where a new user just registered with the network using a first server, each server will receive and maintain the registration information. Then, when the user transmits another request and a different server than the first server receives that request, the current server can process the request without the need for accessing either a remote database or the first server. Likewise, either the first server, or any of the other plurality of servers can efficiently handle subsequent requests from the user.

As is shown in FIGS. 2A and 2B, system 30 includes a remote, off-line database 38 that is connected to the backend network 36 for receiving, processing, filtering, or accumulating communications from the respective servers 34. The database 38 may be used to generate end user reports and perform other non real-time functions so as to relieve the burden on the servers 34 and allow the servers 34 to process the real-time transactions. By being connected to the back-end network 36, database 38 receives broadcast information for processing. Alternately the remote database in FIG. 2B may be accessed using a connection 33 instead of using a connection 35, thus potentially eliminating the need for the back end network 36.

Thus, database 38 may maintain the same content as the servers 34, but since it will not generate broadcast messages to the servers, it is not necessary for the real-time operation of system 30. Rather, database 38 handles the functions that are not needed for the real-time interactive functionality of system 30.

Figure 4A:
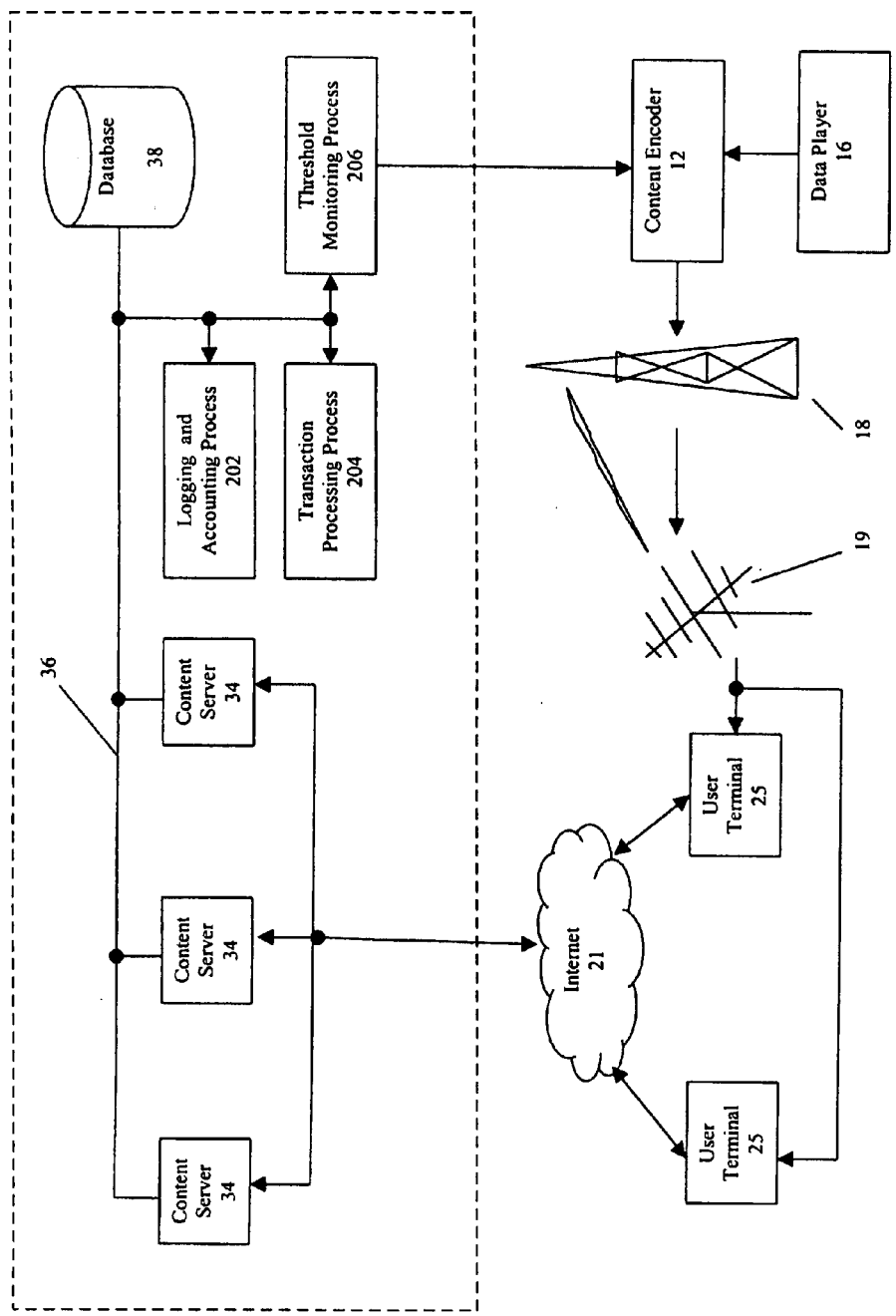
FIG. 4A is a block diagram of an ITV system according to one particular embodiment of the invention.

Referring now to FIG. 4A, a system 200, according to another embodiment of the invention, is illustrated. System 200 is designed to process interactive content-related requests from various ITV receivers 20. As described above, in an interactive content environment, interactive content (i.e. "ITV" data) may be embedded into a TV signal by a content encoder 12. Content encoder 12 receives a TV signal from a data player 16 and embeds ITV data provided to it in the TV signal, thus producing a signal modified by the inclusion of ITV data. The modified signal is then broadcast by a broadcast station 18, and received by antenna 19 and forwarded to the ITV receivers 20. The ITV data is extracted from the TV signal, processed by the respective receivers 20 and, when an appropriate request is made, is then transmitted over the Internet to an interactive content provider, for example, system 200.

ITV data can take many different forms. For example, the ITV data can be a URL link that is utilized by the ITV receivers 20 to access a corresponding web site. Alternatively, the ITV data can be a trigger or other command, which commands the ITV receiver to retrieve or display some interactive content. In the situation where the ITV receiver is commanded to retrieve or display some interactive content, receiver 20 may be programmed to access a particular web site or other information provider, and to transmit a request for content, as described in greater detail below.

System 200 operates similarly to system 30. A request from one of the receivers 20 is received by one of the servers 34. In an interactive content environment, the requests will be for interactive content, transaction-related requests, log-on and registration requests, and the like. The server 34 handles the request, transmits appropriate data back to the receiver 20, and then broadcasts information relating to the request to the other servers 34, over back-end network 36. Each of the servers 34, as well as database 38, receives the broadcast data and copies the data to their local memories.

In one illustrative embodiment, system 200 also maintains a number of processes for performing various functions based upon the requests received from users. For example, system 200 may include a logging and accounting "process" 202, a transaction process 204, and a threshold-monitoring process 206. Each "process" may be a task running on a single machine, or each "process" may be a task running on separate machines.

The logging and accounting process 202 is coupled to the back-end network 36, and monitors data that is broadcast over network 36 for particular transaction activity, for example user registration information. Also, process 202 may keep track of the number of users currently participating in a particular interactive program, or other such information.

Transaction processing process 204 is connected to the backend network 36, and monitors the broadcast data for end user requests relating to credit card information, purchase requests, orders, and the like. Transaction processing process 204 is operative to record such information and to deliver the information to the appropriate third party or parties, such as merchants and credit card companies.

Threshold monitoring process 206 monitors the broadcast data for some significant event, such as a certain number of participants currently participating in an interactive program, or a user who achieves a certain score in an interactive game show, or the like. When such an event occurs, process 206 may transmit a corresponding signal over a frame relay line 208 to content encoder 12 to alert content encoder 12 of the event. Frame relay line 208 may be a virtual private channel ("VPC") to ensure rapid delivery of the information to content encoder 12.

In addition, threshold monitoring process 206 can monitor the users currently interacting with a certain program, and can control the content encoder 12 to encode certain ITV data in the TV signal based on demographic information relating to those particular users. For example, based on the current users viewing an interactive program and their corresponding demographic information, a particular advertisement may be applicable for presentation to those users. Content encoder 12 can embed corresponding ITV data relating to the advertisement in the TV signal, with receivers 20 receiving the ITV data and retrieving and displaying the desired advertisement.

Figure 4B:
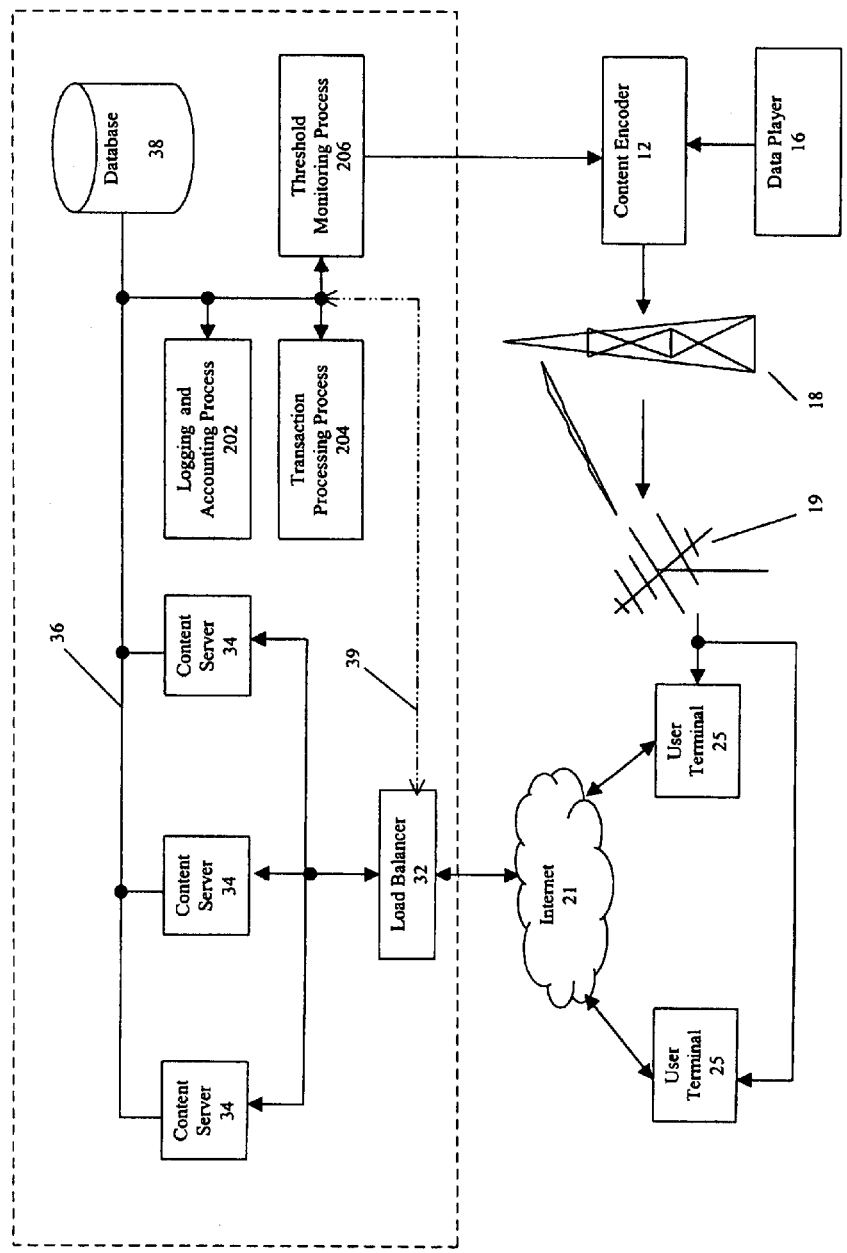
FIG. 4B is a block diagram of an ITV system according to another particular embodiment of the invention.

Referring now to FIG. 4B, a system 200, according to yet another embodiment of the invention, is illustrated. System 200 is designed to process interactive content-related requests from various ITV receivers 20 in a manner similar to the system illustrated in FIG. 4A. ITV data may be embedded into a TV signal by a content encoder 12. Content encoder 12 receives a TV signal from a data player 16 and embeds the ITV data provided to it in the TV signal, thus producing a signal modified by the inclusion of ITV data. The modified signal is then broadcast by a broadcast station 18, and received by antenna 19 and forwarded to the ITV receivers 20. The ITV data is extracted from the TV signal, processed by the respective receivers 20 and, when an appropriate request is made, is then transmitted over the Internet to an interactive content provider, for example, system 200.

System 200 of FIG. 4B operates similarly to system 200 of FIG. 4A, and a from a user perspective they may produce equivalent results. A request from one of the receivers 20 is received by LBS 32 and routed to one of the servers 34. Once the user requests have been routed to content servers 34 the system of FIG. 4B may proceed exactly the same manner as the system of FIG. 4A, except that LBS 32 may be programmed to assume the function of network connection 38. In such a case LBS 32 may be connected by a connection 39 to Database 38, Logging and Accounting process 202, transaction processing process 204 and threshold monitoring process 206, and network 36 may be eliminated. LBS 32 may be programmed to contain database 38 and any or all of processes such as 202, 204 and 206.

In the example embodiments, the system 30 operates in connection with the Internet 21. However, it is not limited to such and embodiments of the invention may be used in connection with different communications networks, such as a local area network (LAN), wide area network (WAN), or any other mechanism that allows for two-way communication of data.

In one embodiment, the ITV data is embedded in the vertical blanking interval ("VBI") channel of the program. However, it will be apparent to those skilled in the art that the ITV data can be inserted in any suitable manner into the TV signal, such as in a supplemental data channel.

From the foregoing, it will be apparent that the present invention provides an efficient system for processing requests received from users over a communication network. The system is modular, as additional servers can be easily added to the system by simply copying the data stored at any of the other servers to the new server, and providing the necessary network addresses.

While the above description contains many specific features illustrating the invention, these should not be construed as limitations on the scope of the invention, but rather as one exemplary embodiments thereof. Many other variations are possible given the tracking herein. Accordingly, the scope of the invention should be determined not by the embodiments illustrated, but by the appended claims and their legal equivalents.

What is claimed is:

1. A system for interacting with end user terminals over a first communications network, the system comprising:
    a plurality of servers coupled to receive communication from the end user terminals over the first communications network;
    an interface disposed between the plurality of servers and end user terminals, the interface being operative to receive requests from the end user terminals and to distribute the requests to the plurality of servers;
    a second communication network coupled to provide communication between the servers in the plurality of servers;
    a first computer program segment resident at a first one of the plurality of servers, wherein said program:
        receives a first request from an end user terminal,
        processes the first request, and
        broadcasts data regarding the first request to a second one of the plurality of servers,
    a second computer program segment resident in the second one of the plurality of servers, wherein said second program:
        stores the data regarding the first request broadcast from the first one of the plurality of servers in a local memory,
        receives a second request from the end user terminal,
        retrieves from the local memory the data regarding the first request for processing the second request; and
        processes the second request based on the retrieved data,
    wherein, the first and second ones of the plurality of servers respectively receiving the first and second requests are selected based on a selection mechanism, the selection mechanism being configured to substantially evenly distribute request processing burdens amongst the plurality of servers.

2. The system of claim 1, wherein the first program segment broadcasts data over the second communication network to the second program segment.

3. The system of claim 2, wherein the second communications network comprises an Ethernet network.

4. The system of claim 3, wherein the second communications network comprises a gigabit Ethernet network.

5. The system of claim 1, wherein the end user terminals comprise ITV receivers, and wherein the requests from the end user terminals are requests from the ITV receivers to retrieve and transmit interactive content to the ITV receivers.

6. The system of claim 1, further including a database for permanent storage of the data relating to processed requests.

7. The system of claim 6, wherein the database is coupled to the second communications network.

8. The system of claim 1, wherein the interface disposed between the plurality of servers and end user terminals further includes means for routing incoming requests to the respective servers.

9. The system of claim 8, wherein the means for routing comprises the Domain Name Server function of the Internet.

10. The system of claim 8, wherein the means for routing comprises a load balancing system (LBS).

11. The system of claim 2, further including a process coupled to the second communications network, wherein the process is programmed to monitor the network for instances of specific transactions.

12. The system of claim 11, wherein one of the process comprises a threshold monitoring process coupled to a content encoder, wherein the threshold monitoring process is programmed to process data transmitted over the second communications network, determine that a threshold has been exceeded, and to transmit a corresponding notification to the content encoder.

13. The system of claim 12, further including a frame relay line connected to the threshold monitoring process and the content encoder to transmit information there between.

14. The system of claim 11, wherein the process comprises a transaction processing process.

15. A method of interacting with user terminals over a communications network comprising:
    receiving a first request from a user terminal;
    allocating the first request to a first server selected according to a selection mechanism, the selection mechanism being configured to substantially evenly distribute request processing burdens amongst the plurality of servers;
    processing the first request at the first server;
    transmitting data relating to the first request to at least a second server;
    storing the data in a local memory of the second server;
    receiving a second request from the user terminal;
    allocating the second request to a second server selected according to the selection mechanism;
    retrieving by the second server from the local memory the data relating to the first request for processing the second request; and
    processing the second request by the second server based on the retrieved data.

16. The method of claim 15, wherein transmitting data is performed over a private network.

17. The method of claim 15, wherein transmitting data is performed in a LBS.

18. The method of claim 17 wherein the LBS, which transmits data, distributes requests to the plurality of servers.

19. The method of claim 15, wherein allocating the request uses a round robin allocation to distribute the load over the plurality of servers.

20. The method of claim 15, wherein forwarding the request further comprises performing a load analysis to distribute the incoming requests over the plurality of servers.

21. The method of claim 15, wherein processing the request comprises retrieving and transmitting interactive content to an interactive television receiver.

22. The method of claim 15, further comprising monitoring the data relating to the request at each server.

23. The method of claim 22, further comprising:
detecting a threshold from the monitored data;
providing an indication of detection of the threshold to a content encoder;
encoding the indication of detection of the threshold; and
providing the encoded indication of reaching the threshold to at least one ITV receiver.

24. The method of claim 23 wherein detecting a data threshold comprises detecting a certain number of users.

25. The method of claim 24 wherein encoding the indication of detecting the threshold comprises placing an indication of detecting the threshold within a video signal to be provided to an ITV receiver.

26. A system for interacting with end user terminals over a communications network, the system comprising:
plural servers adapted for communication with the respective terminals over the communications network, wherein the servers are connected for communication with the other respective servers;
an interface connected to the respective servers and operative to receive requests from the user terminals and to route the requests to the respective servers; and
wherein a first of the plural servers is programmed to receive a first request from a particular end user terminal, process the first request, and broadcast data regarding the first request to a second one of the plural servers, and wherein the second one of the plural servers is programmed to store the broadcast data in a local memory, receive a second request from the end user terminal, retrieve from the local memory the data regarding the first request for processing the second request, and process the second request based on the retrieved data, and wherein the first and second ones of the plurality of servers respectively receiving the first and second requests are selected based on a selection mechanism, the selection mechanism being configured to substantially evenly distribute request processing burdens amongst the plurality of servers.

27. The system of claim 26, further including a back-end network connected to each of the servers, and wherein the servers are programmed to broadcast the data over the back-end network.

28. The system of claim 27, wherein the terminals comprise ITV receivers, and wherein the servers are responsive to requests from the ITV receivers to retrieve and transmit interactive content to the terminals.

29. The system of claim 26, further including a database for storage of the data relating to processed requests.

30. The system of claim 26, further including a plurality of processes connected to the back-end network, wherein each process is programmed to monitor the network for certain data and to process the appropriate data.

31. The system of claim 30, wherein one of the processes comprises a threshold monitoring process connected to a content encoder, wherein the threshold monitoring process is programmed to process data transmitted over the back-end network, determine that a threshold has been exceeded, and to transmit corresponding data to the content encoder.

32. The system of claim 1, wherein the selection mechanism randomly selects the one of the plurality of servers.

33. The system of claim 1, wherein the selection mechanism is a round robin selection mechanism.

34. The system of claim 1, wherein each server maintains all data needed for handling a request.

35. The system of claim 1, wherein the data regarding the first request is registration data for a user of the end user terminal.

36. The system of claim 1, wherein the data regarding the first request is transaction data transmitted by a user of the end user terminal.

37. The system of claim 1, wherein the first of the plural servers is programmed to concurrently broadcast the data regarding the first request to a plurality of the plural servers.

* * * * *